Patented Mar. 19, 1940

2,194,235

UNITED STATES PATENT OFFICE 2,194,235

PROCESS FOR THE MANUFACTURE OF POLYNUCLEAR UNSATURATED CYCLIC POLYKETONES

Leopold Ruzicka, Zurich, and Albert Wettstein, Basel, Switzerland, assignors to Society of Chemical Industry In Basle, Basel, Switzerland No Drawing. Application March 23, 1936, Serial No. 70,546. In Switzerland March 27, 1935

4 Claims. (Cl. 260—397)

This invention relates to the manufacture of polynuclear unsaturated cyclic polyketones of the aetio-cholane series by converting into ketone-groups by careful oxidation or dehydrogenation the hydroxyl groups of a corresponding polynuclear unsaturated cyclic oxy-monoketone, if desired with temporary protection of the carbon double linkings.

The parent materials may be made from sterols or bile acids unsaturated in the nucleus by oxidizing degradation of the long side chains.

The hydroxyl-groups of the cyclic oxy-monoketone are converted into ketonic groups, for example by treatment of the compound with chromic acid in glacial acetic acid in the cold or by heating the compound with copper oxide. Preferably the carbon double linkings are first protected from the oxidation by attachment of halogen or hydrogen halide to the parent material, and after the oxidation such halogen or hydrogen halide is removed from the cyclic polyketone by an agent suitable for removal of these bodies. The halogen may be removed in known manner, for instance by zinc dust and acetic acid, or by treatment with an alkali iodide, and the hydrogen halide by means of a tertiary base, such as pyridine or dimethylaniline or by reaction with a salt of a carboxylic acid, for example an alkali acetate.

If in the parent material there is a carbon double linking in $\beta,\gamma$-position to a hydroxyl-group it returns generally during the reaction in $\alpha,\beta$-position to the newly produced keto-group.

The compounds produced by the invention are closely related to the sexual hormones and are therefore of therapeutic value. They also serve as intermediate products for the production of other valuable therapeutic compounds.

The following example illustrates the invention:

1 part by weight of $\Delta^{5,6}$-dehydroandrosterone ($\Delta^{5,6}$-3-hydroxy - aetio - cholenone-(17)) is dissolved in 28 parts of glacial acetic acid and there are added, by drops, to the cold solution a solution of 0.555 part of bromine in 11 parts of glacial acetic acid.

The mixture is then gradually mixed at room temperature with a solution of 1.15 parts of chromium trioxide and 45 parts of acetic acid of 95 per cent. strength, and the mixture thus obtained is allowed to stand for 14 hours with occasional shaking. The whole is then poured into 500 parts of cold water, whereupon there separates immediately a solid flocculation which is filtered through a glass filter and carefully washed with water.

The still moist nearly colourless diketone-dibromide is dissolved in 28 parts of glacial acetic acid, 14 parts of zinc dust are added and the whole is kept with constant shaking for 12 minutes on the boiling water-bath. After filtration through a glass filter the solid matter is washed with a little glacial acetic acid and the clear solution is poured into 360 parts of quite cold water. By means of a glass rod the milky liquid is stirred until flocculation is complete and the supernatant liquid is quite bright and clear as water. After filtration through a glass filter the solid matter is washed with much water and dried in a vacuum over phosphorous pentoxide. It is recrystallized in the presence of a little animal charcoal from hexane and the $\Delta^{4,5}$-androstene-dione [$\Delta^{4,5}$-aetio-cholene-dione-(3.17)] of melting point 173–174° C. is thus obtained. This new compound is supposed to have the following constitution,

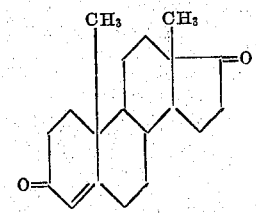

The $\Delta^{4,5}$-androstene-dione proves to be highly active in the comb growth test in the capon but particularly in the seminal vesicle test in the rat.

A similar compound is obtained by starting from $\Delta^{4,5}$-dehydroandrosterone.

A permanganate, such as potassium permanganate as well as copper oxide may also be used as the oxidizing agent.

What we claim is:

1. A process for the production of $\Delta^{4,5}$-androstene-dione from $\Delta^{4,5}$-dehydroandrosterone comprising protecting the carbon double bond of the latter by the addition of a member selected from the group consisting of halogen and hydrogen halide, and then subjecting the product to the action of an oxidizing agent.

2. A process for the production of $\Delta^{4,5}$-androstene-dione from $\Delta^{4,5}$-dehydroandrosterone comprising protecting the carbon double bond of the latter by the addition of hydrogen halide, subjecting the product to the action of an oxidizing agent, and then re-establishing the carbon double bond by treating the halogenated product with a member selected from the group consisting of a tertiary base and a salt of a carboxylic acid.

3. A process for the production of $\Delta^{4,5}$-androstene-dione from $\Delta^{4,5}$-dehydroandrosterone comprising protecting the carbon double bond of the latter by the addition of a member selected from the group consisting of halogen and hydrogen halide, and then subjecting the product to the action of chromic acid.

4. A process for the production of $\Delta^{4,5}$-androstene-dione from $\Delta^{4,5}$-dehydroandrosterone comprising protecting the carbon double bond of the latter by the addition of a member selected from the group consisting of halogen and hydrogen halide, and then subjecting the product to the action of a permanganate.

LEOPOLD RUZICKA.
ALBERT WETTSTEIN.